United States Patent
Meiss et al.

(10) Patent No.: US 10,194,263 B2
(45) Date of Patent: *Jan. 29, 2019

(54) PROMOTION OPERABLE RECOGNITION SYSTEM

(71) Applicant: AT&T Mobility II LLC, Atlanta, GA (US)

(72) Inventors: Thomas Michael Meiss, Atlanta, GA (US); Jeffrey Mikan, Cumming, GA (US)

(73) Assignee: AT&T MOBILITY II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/927,437

(22) Filed: Oct. 29, 2015

(65) Prior Publication Data

US 2016/0050524 A1   Feb. 18, 2016

Related U.S. Application Data

(63) Continuation of application No. 14/300,083, filed on Jun. 9, 2014, now Pat. No. 9,202,235, which is a continuation of application No. 13/548,681, filed on Jul. 13, 2012, now Pat. No. 8,787,887, which is a
(Continued)

(51) Int. Cl.
| | |
|---|---|
| *H04W 4/02* | (2018.01) |
| *G06Q 30/02* | (2012.01) |
| *H04L 9/08* | (2006.01) |
| *H04M 7/00* | (2006.01) |

(Continued)

(52) U.S. Cl.
CPC .......... *H04W 4/02* (2013.01); *G06Q 30/0241* (2013.01); *G06Q 30/0267* (2013.01); *H04L 9/0825* (2013.01); *H04M 7/0024* (2013.01); *H04W 4/18* (2013.01); *H04M 1/72572* (2013.01)

(58) Field of Classification Search
CPC ....... H04W 4/02; H04W 4/18; H04M 7/0024; H04M 1/72572; H04L 9/0825; G06Q 30/0241; G06Q 30/0267
See application file for complete search history.

(56) References Cited

U.S. PATENT DOCUMENTS

| | | |
|---|---|---|
| 6,151,491 A | 11/2000 | Farris et al. |
| 6,167,253 A | 12/2000 | Farris et al. |
| 6,314,094 B1 | 11/2001 | Boys |

(Continued)

OTHER PUBLICATIONS

International Search Report dated Feb. 16, 2007 for PCT Application Serial No. US06/26339, 2 Pages.
(Continued)

*Primary Examiner* — Marcos Torres
(74) *Attorney, Agent, or Firm* — Amin, Turocy & Watson, LLP

(57) ABSTRACT

A recognition system is employed in conjunction with a subscriber's cellular phone and the network serving the subscriber. According to an embodiment, a subscriber can use a cellular phone to receive and capture data signals, from, for example, an audio output. The captured data signals can be transmitted to a remote network element that receives and translates the captured data and performs a plurality of functions. A promotion can be selectively tailored to a user based in part on the user location.

19 Claims, 11 Drawing Sheets

Related U.S. Application Data continuation of application No. 11/259,388, filed on Oct. 26, 2005, now Pat. No. 8,249,559.

(51) Int. Cl.
*H04W 4/18* (2009.01)
*H04M 1/725* (2006.01)

(56) References Cited

U.S. PATENT DOCUMENTS

| | | |
|---|---|---|
| 6,381,314 B1 | 4/2002 | Walinski |
| 6,446,076 B1 | 9/2002 | Burkey et al. |
| 6,529,584 B1 | 3/2003 | Ravago et al. |
| 6,711,474 B1 | 3/2004 | Treyz et al. |
| 6,779,042 B1 | 8/2004 | Kloba et al. |
| 6,847,823 B2 | 1/2005 | Lehikoinen et al. |
| 6,868,403 B1 | 3/2005 | Wiser et al. |
| 6,892,067 B1 | 5/2005 | Sharma et al. |
| 6,947,728 B2 | 9/2005 | Tagawa et al. |
| 6,965,770 B2 | 11/2005 | Walsh et al. |
| 7,000,032 B2 | 2/2006 | Kloba et al. |
| 7,027,995 B2 | 4/2006 | Kaufman |
| 7,089,202 B1 | 8/2006 | McNamar et al. |
| 7,107,045 B1 | 9/2006 | Knoop |
| 7,133,659 B2 | 11/2006 | Zalewski et al. |
| 7,239,871 B2 | 7/2007 | Shamp et al. |
| 7,258,614 B1 | 8/2007 | Kates et al. |
| 7,266,343 B1 | 9/2007 | Yli-juuti et al. |
| 7,441,203 B2 | 10/2008 | Othmer et al. |
| 7,490,775 B2 | 2/2009 | Biderman |
| 2002/0073205 A1 | 6/2002 | Mostafa |
| 2002/0128908 A1 | 9/2002 | Levin et al. |
| 2002/0156691 A1 | 10/2002 | Hughes et al. |
| 2003/0003897 A1 | 1/2003 | Hyon |
| 2003/0014749 A1 | 1/2003 | Simons et al. |
| 2003/0021441 A1 | 1/2003 | Levy et al. |
| 2003/0023424 A1 | 1/2003 | Weiner |
| 2003/0050050 A1 | 3/2003 | Higuchi et al. |
| 2003/0055516 A1 | 3/2003 | Gang et al. |
| 2003/0060157 A1 | 3/2003 | Henrick |
| 2003/0073411 A1 | 4/2003 | Meade |
| 2003/0110211 A1 | 6/2003 | Danon |
| 2003/0135513 A1 | 7/2003 | Quinn et al. |
| 2003/0177073 A1 | 9/2003 | Ogai |
| 2004/0038665 A1 | 2/2004 | Hosono |
| 2004/0043790 A1 | 3/2004 | Ben-David et al. |
| 2004/0108381 A1 | 6/2004 | Elliot et al. |
| 2004/0141476 A1 | 7/2004 | Chumbley et al. |
| 2004/0242207 A1 | 12/2004 | Chi |
| 2004/0243519 A1* | 12/2004 | Perttila .......... G06Q 20/20 705/75 |
| 2005/0009466 A1 | 1/2005 | Kamdar et al. |
| 2005/0033855 A1 | 2/2005 | Moradi et al. |
| 2005/0038712 A1 | 2/2005 | Veeneman |
| 2005/0045373 A1 | 3/2005 | Born |
| 2005/0143133 A1 | 6/2005 | Bridgelall |
| 2005/0152267 A1 | 7/2005 | Song et al. |
| 2005/0215239 A1 | 9/2005 | Kopra et al. |
| 2005/0216855 A1 | 9/2005 | Kopra et al. |
| 2005/0227674 A1* | 10/2005 | Kopra et al. .......... 455/414.1 |
| 2006/0008256 A1 | 1/2006 | Khedouri et al. |
| 2006/0012677 A1 | 1/2006 | Neven et al. |
| 2006/0025117 A1 | 2/2006 | Silverbrook et al. |
| 2006/0045555 A1 | 3/2006 | Morimoto et al. |
| 2006/0063590 A1* | 3/2006 | Abassi .......... A63F 13/12 463/29 |
| 2006/0100925 A1 | 5/2006 | Finaly |
| 2006/0116167 A1 | 6/2006 | Raviv et al. |
| 2007/0057038 A1* | 3/2007 | Gannon .......... G06Q 20/20 235/380 |
| 2007/0155402 A1* | 7/2007 | Van Erlach .......... 455/456.1 |
| 2007/0188331 A1 | 8/2007 | Kumagai et al. |
| 2007/0250232 A1 | 10/2007 | Dourney et al. |
| 2008/0167867 A1 | 7/2008 | Fein et al. |
| 2008/0183535 A1 | 7/2008 | Kahana |
| 2008/0207182 A1 | 8/2008 | Maharajh et al. |
| 2009/0054092 A1 | 2/2009 | Stonefield et al. |
| 2009/0163228 A1 | 6/2009 | Blumberg et al. |

OTHER PUBLICATIONS

OA dated Jul. 1, 2008, for U.S. Appl. No. 11/259,388, 12 pages.
Final OA dated Oct. 31, 2008 for U.S. Appl. No. 11/177,746, 30 pages.
OA dated Dec. 15, 2008 for U.S. Appl. No. 11/259,388, 17 pages.
OA dated Mar. 19, 2009 for U.S. Appl. No. 11/259,388, 12 pages.
OA dated May 12, 2009 for U.S. Appl. No. 11/177,746, 33 pages.
OA dated Feb. 4, 2010 for U.S. Appl. No. 11/259,388, 16 pages.
OA dated Oct. 14, 2009 for U.S. Appl. No. 11/259,388, 18 pages.
Final OA dated Dec. 21, 2009 for U.S. Appl. No. 11/177,746, 30 pages.
OA dated Sep. 2, 2010 for U.S. Appl. No. 11/177,746, 183 pages.
Final OA dated Jul. 9, 2010 for U.S. Appl. No. 11/259,388 20 pages.
Office Action dated Oct. 6, 2010 for U.S. Appl. No. 11/259,388, 16 pages.
OA dated Mar. 22, 2011 for U.S. Appl. No. 11/177,746, 61 pages.
OA dated Mar. 28, 2011 for U.S. Appl. No. 11/259,388, 17 pages.
OA dated May 31, 2011 for U.S. Appl. No. 11/177,746, 30 pages.
OA dated Aug. 22, 2011 for U.S. Appl. No. 11/259,388, 21 pages.
OA dated Feb. 2, 2012 for U.S. Appl. No. 11/259,388, 12 pages.
Final OA dated Aug. 3, 2012 for U.S. Appl. No. 11/177,746, 46 pages.
Final OA dated Sep. 19, 2012 for U.S. Appl. No. 13/548,681, 16 pages.
Office Action dated Mar. 14, 2013 for U.S. Appl. No. 13/548,681, 27 pages.
Office Action dated Oct. 24, 2013 for U.S. Appl. No. 13/548,681, 14 pages.
Office Action dated Feb. 26, 2015 for U.S. Appl. No. 14/300,083, 28 pages.

* cited by examiner

PROMOTION OPERABLE RECOGNITION SYSTEM

CROSS-REFERENCE TO RELATED APPLICATION

This application is a continuation of, and claims the benefit of priority to each of, U.S. patent application Ser. No. 14/300,083 entitled PROMOTION OPERABLE RECOGNITION SYSTEM, filed Jun. 9, 2014, which is a continuation of and claims the benefit of priority to, U.S. patent application Ser. No. 13/548,681 entitled PROMOTION OPERABLE RECOGNITION SYSTEM, filed Jul. 13, 2012 (now U.S. Pat. No. 8,787,887 issued on Jul. 22, 2014), which is a continuation of and claims the benefit of priority to U.S. patent application Ser. No. 11/259,388 entitled "PROMOTION OPERABLE RECOGNITION SYSTEM" and filed Oct. 26, 2005 (now U.S. Pat. No. 8,249,559 issued on Aug. 21, 2012). The entireties of each of the above noted applications are hereby incorporated herein by reference.

TECHNICAL FIELD

The subject disclosure relates generally to wireless communications, and more specifically, to a recognition system for advertising and offering promotions through mobile communication devices.

BACKGROUND

The telecommunications industry is rapidly evolving and various types of mobile communications and systems are continuously entering the market. The Internet with its vast IP (Internet Protocol) capabilities has provided the telecommunications industry the means to provide services that were not previously available to the cellular user. The use of mobile devices, such as cellular telephones, Personal Digital Assistants (PDAs) and handheld computers is growing at accelerated rates. Cellular telephones are inexpensive and allow individuals the freedom to move around while staying in contact with family, friends, and others. Mobile devices that play and record music or moving pictures are widely accepted because they provide entertainment.

A usage of mobile communication devices can be a music recognition service in which a user dials an identification number utilizing a numerical keypad to initiate an audio recognition service. When prompted, the user holds the mobile device near a music source for approximately fifteen seconds. Shortly thereafter, the user receives a text message at the mobile communication device that identifies the name of the song title and recording artist. The identification music service is operated through a propriety recognition database of more than a million recorded songs.

Related to this concept is the ability to retrieve a coupon on a mobile communication device. In particular, a coupon can be retrieved on a mobile communication device by manually inputting a short code. For example, a user can dial a "short code" promoted by a particular company on its products and advertisements. This allows the user to request the company to send a text message that appears in the form of a coupon on a screen of the mobile communication device.

Another advertising use of mobile phones is a short code that is displayed on posters and cardboard displays at stores to promote a sweepstakes. Users enter the code into their mobile communication devices and are then prompted to type in the numbers printed on the inside of a drink cap, for example. The numbers indicate the number of points the user has earned. The points can be tracked in a digital account associated with the mobile communication device initiating number. The user can use the device to register on a promotional Web site and redeem points for prizes.

Although receiving coupons and playing sweepstakes games on mobile communication devices is known, a unique combination of receiving a coupon on a mobile device through audio, video, or other recognition means is not known. Such a technique provides the user with an interactive means to receive promotional information that can be valuable to a user.

DETAILED DESCRIPTION

Figure 1:
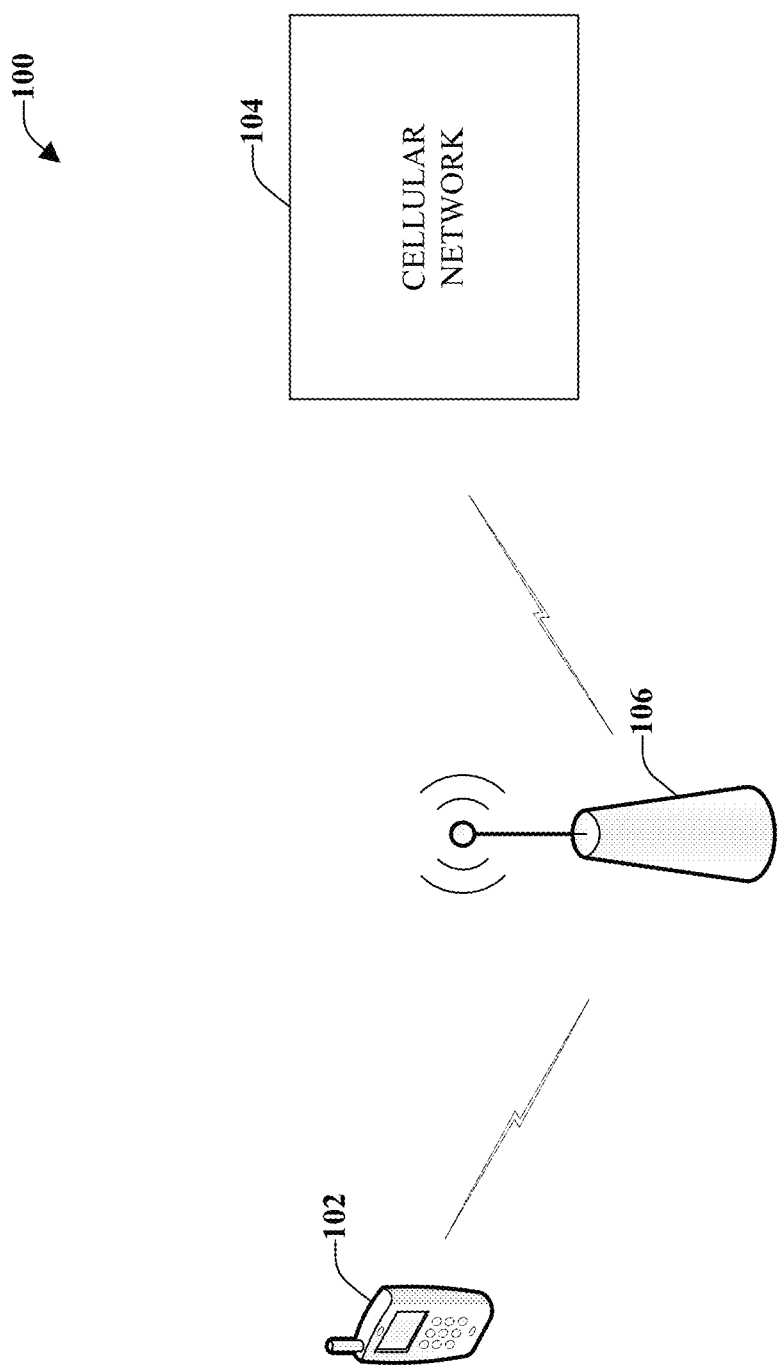
FIG. 1 illustrates a recognition system that facilitates promotional and/or advertising opportunities.

The various embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the embodiments may be practiced without these specific details. In other instances, well-known structures and devices are shown in block diagram form in order to facilitate describing such embodiments.

As used in this application, the terms "component," "module," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

As used herein, the terms to "infer" or "inference" refer generally to the process of reasoning about or inferring states of the system, environment, and/or user from a set of observations as captured through events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Furthermore, the various embodiments may be implemented as a method, apparatus, or article of manufacture using standard programming and/or engineering techniques to produce software, firmware, hardware, or any combination thereof to control a computer to implement the disclosed embodiments. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the subject disclosure. Moreover, the word "exemplary" is used herein to mean serving as an example, instance, or illustration. Any aspect or design described herein as "exemplary" is not necessarily to be construed as preferred or advantageous over other aspects or designs.

According to an embodiment is a promotion recognition system. The system can include a capture component that captures data corresponding to a cellular network promotion request. The system can further include a communication component that communicates the captured data to the cellular network in response to the promotion request and receives a subsequent instruction from the cellular network. In accordance with an embodiment, the system further includes a location component that transmits location information along with the captured data to the cellular network. According to a further embodiment, system includes an RFID component that identifies RFID data imbedded in the subsequent instruction received from the cellular network.

According to a further embodiment is a system for providing promotional opportunities. System includes a component that receives a communication from a mobile handset and an identifier component that identifies a location of the mobile handset and/or a cellular provider of the mobile handset. System can further include a translate component that translates the received communication into a desired medium (e.g., coupon, sweepstakes entry, contest entry, . . . ). According to an embodiment, the translate component can selectively tailor the desired medium to a user of the mobile handset. Such tailoring can take into consideration a user location, a user preference, or other user parameters.

Still yet another embodiment is a method for wirelessly communicating a promotion. The method includes requesting a particular data signal from a mobile handset. Data is received from the mobile handset and translated into a promotional medium. It is then ascertained whether the received data is appropriate for the promotional medium and a corresponding communication is output. According to an embodiment, an error message can be transmitted if the received data is not appropriate for the promotional medium. In accordance with another embodiment, a promotional opportunity can be transmitted if the received data is appropriate for the promotional medium. In other embodiments, a geographic location of the mobile handset is determined and a promotion available in the geographic location is identified and communicated to the mobile handset. In a further embodiment, the corresponding communication can be selectively tailored for a user for the mobile handset.

With reference now to the drawings, FIG. 1 illustrates a recognition system 100 that facilitates promotional and/or advertising opportunities. System 100 includes a mobile handset 102 that communicates wirelessly with a cellular network 104 by way of an access point 106. For example, access point 106 can enable mobile handset 102 to access a Wireless Local Area Network (LAN), a LAN, a Bluetooth network, or other suitable networks. The signaling that can occur between the mobile handset 102 and the network 104 may be a call flow path initiated from the mobile handset 102 through the network 104 to a remote network element. The call may be terminated (e.g., connection established) so that a path is established to exchange information to and/or from the mobile handset 102 and to the remote network element. It should be appreciated that while one mobile handset 102 is shown with the disclosed embodiment(s) for simplicity, there can be more than one handset 102 associated with the disclosed embodiments(s).

Cellular network 104 can be a service provider of the mobile handset 102. In another embodiment, mobile communication device 102 can communicate wirelessly in a peer-to-peer mode, for example, between two cellular phones, between a cellular phone and a computing device (e.g., a desktop computer, a portable computer, a personal digital assistant (PDA)), and other networks, systems and computing devices. Mobile communication device 102 can include a plurality of communications technology, including but not limited to cellular communications technology (e.g., for 2G, 2.5G, 3G, 4G cellular networks, . . . ), unlicensed network technology (e.g., WiFi, Bluetooth, WiMax, . . . ), serial communication technology (e.g., universal serial bus (USB), IEEE 1394), infrared, and the like.

System 100 is configured to facilitate playing or presentation of content (e.g., speech, audio, graphics, video, multimedia content, coupons, . . . ). It should be noted that although this description will focus on music as one aspect of the multimedia content, it is to be understood that the disclosed innovative architecture and techniques apply to a plurality of components of multimedia content such as voice, images, text, audio, and video content, for example, and in any combination (e.g., text and voice, images and music, . . . ). According to an embodiment, system 100 is configured to receive and process metadata associated with a music track, all or part of which can be presented to the user through a display and/or audibly. The metadata can include, for example, attributes associated with the data, such as artist name, album name, track title, duration of track, etc. The metadata can be readily received with the music from digital satellite radio systems, television, or other audio output system.

In addition or alternatively, a user can receive information regarding promotional and/or advertising opportunities from various retail establishments, marketing firms, or other advertising sponsors. Such promotional opportunities can be communicated to a user of mobile handset 102, based in part on metadata associated with a plurality of different transmissions including an audible sound (e.g., over a speaker, a music track, and so forth), or a visual transmission (e.g., video, picture, and so forth). For example, a user that is interested in a particular music track can receive promotional opportunities (e.g., discount coupons, sweepstakes entries, contest information) in response to a transmission of the music track from the mobile handset 102 to a cellular network 104. Such promotional opportunities can be related to the particular metadata and/or can be related to similar or compatible metadata. For example, the metadata can be classified to indicate that if a user likes or requests information regarding a music track, that user may be interested in another music track by the same or a different artist. In another embodiment, the associated metadata may be classified based on what other users have requested in addition to the particular music track (e.g., what others who have requested information on this music track also requested information about).

In another embodiment, the user can be presented with promotional opportunities based on location. For example, a user at a sporting event or stadium (e.g., football, basketball, baseball, hockey, tennis, . . . ) might receive a broadcast over a loudspeaker to record a particular sound or picture. That same user, associated with a particular cellular network can rebroadcast that sound/picture at a substantially similar time or at a later time back to cellular network 104 to receive a promotional item (e.g., discount or free tickets to another event, discounts on sporting memorabilia, . . . ). It should be appreciated that the list of promotional opportunities is numerous and all such opportunities cannot be named herein. It should also be appreciated that the information utilized to trigger such opportunities is also numerous, provided there is a means for system 100 to recognize and respond to such triggers.

Figure 2:
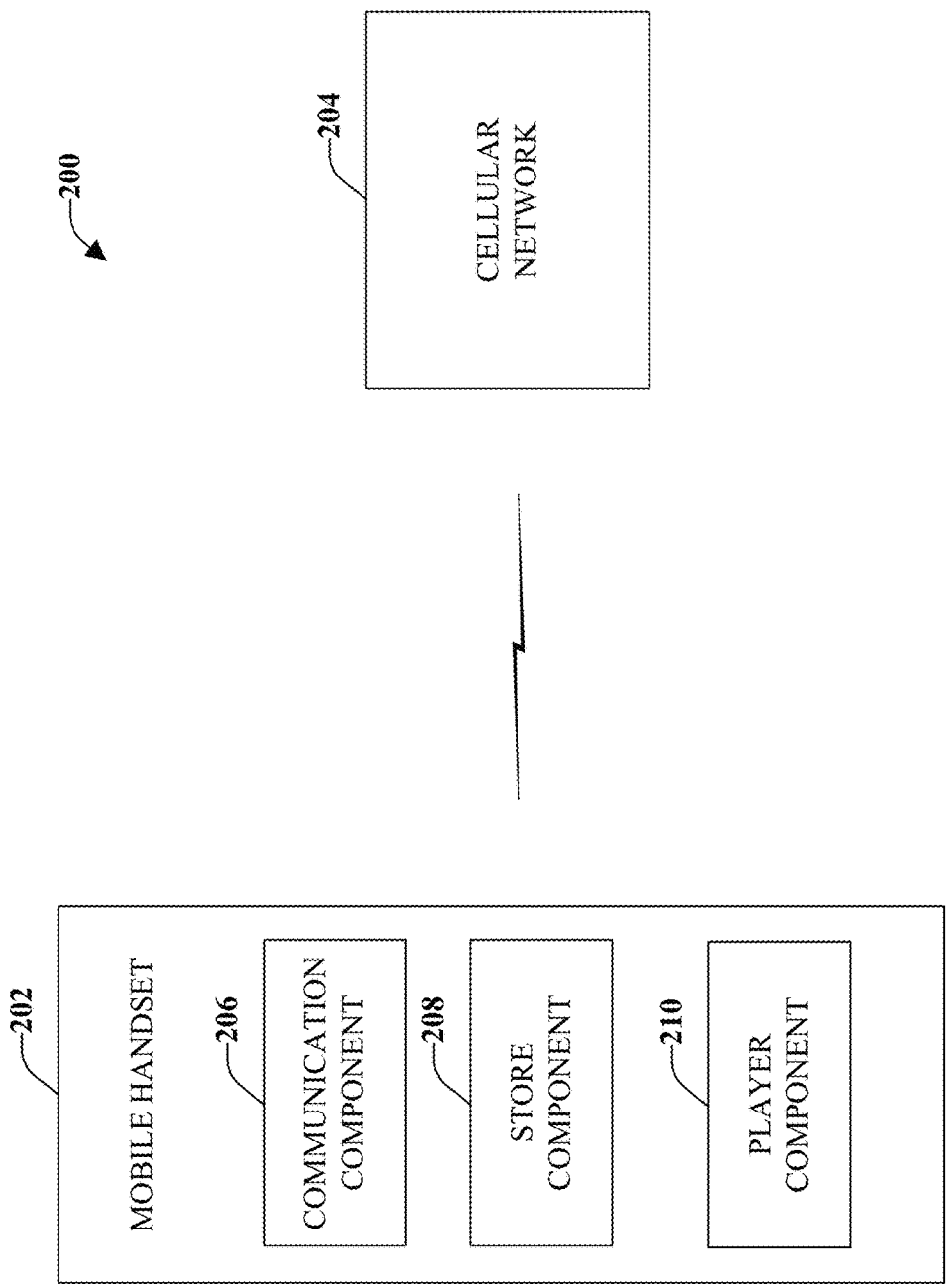
FIG. 2 illustrates an exemplary system that facilitates cellular multimedia services.

FIG. 2 illustrates an exemplary system 200 that facilitates cellular multimedia services. System 200 includes a mobile handset 202 that communicates wirelessly with a cellular network 204. Included in system 200 can be a communication component 206, a store component 208, and a player component 210. It is to be understood that the components can be combined or placed in a different configuration. There can also be more or less components than those shown and described and all such modifications are intended to fall within the scope of the subject disclosure.

The mobile handset 202 has communication capacity through the communication component 206 that is configured to transmit and receive a communication that includes content (e.g., speech, audio, graphics, video, multimedia content, . . . ). For example, communication component 206 can receive an audio tone from, for example, an audible broadcast, a broadcast radio network, satellite radio network, Internet radio services, websites, and the like.

The content can be stored by the user in a store component 208. The storage capacity can include flash memory technology already included within the mobile handset 202, an attachment to the handset 202 that can be removed or reused, and/or as a removable memory that can be inserted, and once loaded, removed and used elsewhere with the content stored thereon.

Player component 210 allows mobile handset 202 to play the content. Thus, the user can listen and/or view the content as it is being received and played. The player component 210 in combination with the communication component 206 can facilitate broadcasting the received content to other devices and/or remote network 204. For example, communication component 206 can retransmit the audio tone to receive from the cellular network 204 a coupon, sweepstakes entry, participate in a contest, etc. Player component 210 is further configured to interpret (e.g., decode) an embedded signal in the received audible tone into a subsequent instruction (e.g., go to your nearest XYZ store to redeem a coupon). The user can then react based on the content of the embedded signal in accordance with the instructions in the announcement.

According to an embodiment, system 200 is configured to conduct a contest in which a radio station personality might announce that XYZ cellular provider will give out free tickets to a concert to the first caller who receives and transmits a particular audio tone received directly from the speakers on the radio. When the tone or sound is played, the mobile handset 202 recognizes the tone and transmits the information to its network 204. The first caller may then be sent a coupon from the network 204 and/or the tickets in electronic form for entry to the concert. In other embodiments, the audio tone might have an embedded signal. This embedded signal can be encrypted and sent to the network 204. The network 204 recognizes the tone or signal using, for example, a database that contains the tones or signals and can compare the received tone/signal with a correct tone/signal for a particular promotion. If it is the correct signal, the user is allowed to enter the contest or receive other promotional items. The network 204, for example, can output a text message or other message to the user through the mobile handset 202. The user can receive this message on a display and might be given further instructions to redeem the coupon such as, for example, "go to your nearest electronic store within the next hour and receive 75% off any one item."

In accordance with other embodiments, system 200 can be configured to conduct a promotional campaign (e.g., contest, sweepstakes, discount tickets, coupons, . . . ) utilizing an embedded image. A user might be instructed to capture an image (e.g., still image, video image) of a particular item, such as a billboard. The billboard might have an embedded image within it, which can be transmitted to a remote server in the network 204 and transformed into a signal. The embedded image could be anything not normally received such as a particular arrangement of objects, a number, or a plurality of other images or combination of images. The network 204 can distinguish the various images received based upon the particular embedded image, such as by scanning the received image to locate the embedded image. If the embedded image is present, it is transformed into a signal and an associated promotional item (e.g., coupon, sweepstakes entry, and so forth) is output to the user. This output can be in the form of a message sent to a display of the user device, or a voice message, or any other means of communicating the promotion to the user.

Figure 3:
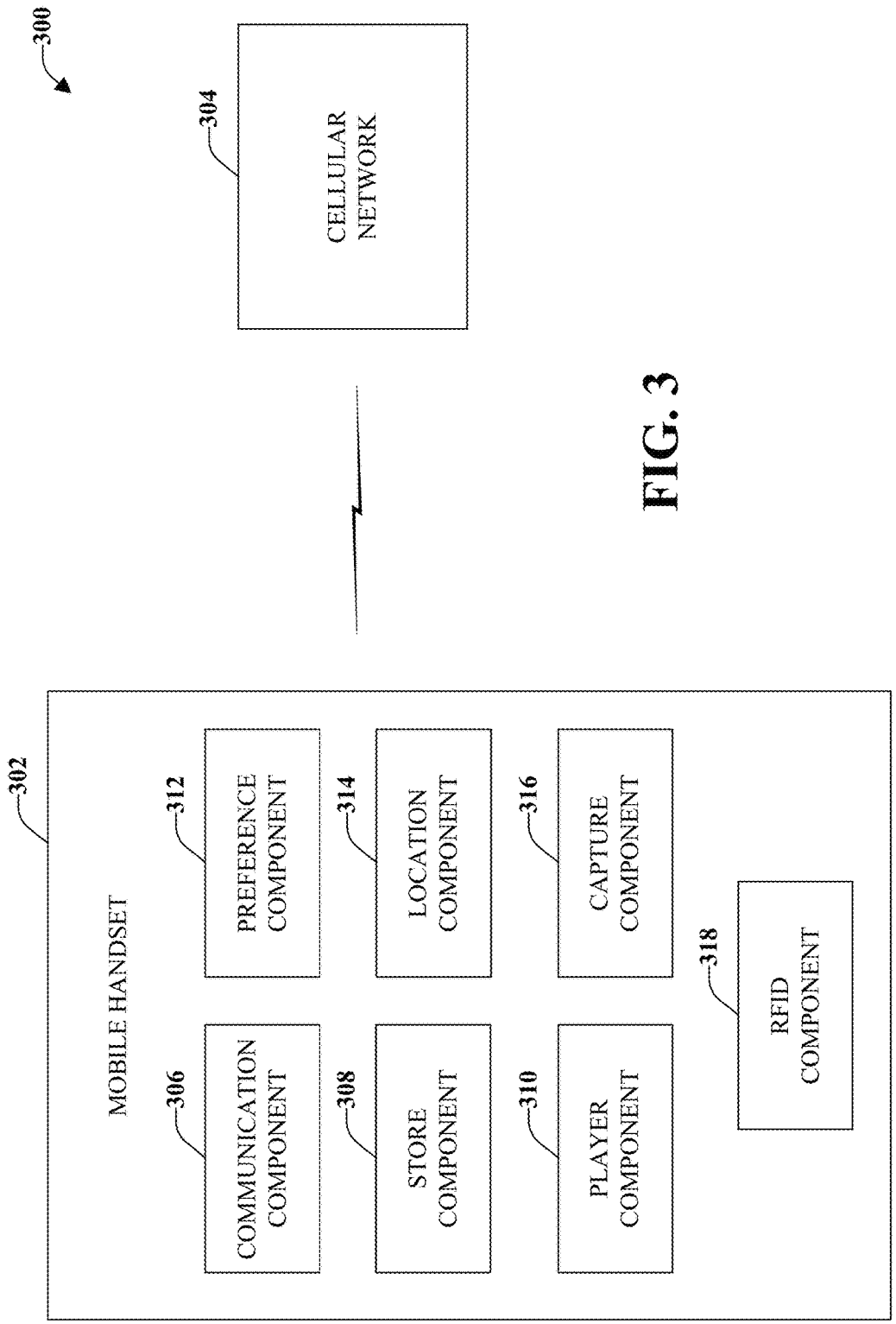
FIG. 3 illustrates an exemplary system for communicating promotional opportunities.

FIG. 3 illustrates an exemplary system 300 for communicating promotional opportunities. System 300 includes a mobile handset 302 that interfaces with a cellular network 304. User of mobile handset 302 can communicate wirelessly with cellular network 304 to take advantage of promotional opportunities (e.g., coupons, sweepstakes, contests, and the like). It should be understood that while system 300 is illustrated and described with particular components, system 300 can have different components or a different number of components, in addition, the components can have a different arrangement with system 300 and/or can be combined. It should also be understood that mobile handset 302 could contain some or all of the components according to various embodiments.

Mobile handset 302 can include a communication component 306 configured to receive and transmit a communication and such communication can include content (e.g., speech, audio, graphics, video, multimedia content, . . . ). The communication and/or content can be stored in store component 308 for later transmission, viewing, playing, etc. A player component 310 is configured to play the communication and/or content.

In other embodiments, mobile handset includes a user preference component 312 that can accept, infer, detect, request, etc. a user preference. For example, preference component 312 can infer a preference of the user based on information previously requested by user. By way of example and not limitation, if a user requests information for a particular music track, preference component 312 can determine other music tracks, artists, etc. that might be of interest to the user. In another embodiment, preference component 312 can receive potential preference information from cellular network 304, based upon a subset of information contained within cellular network 304. In a further embodiment, preference component 312 can seek out other mobile handsets 302 that have the particular music track stored in a store component, for example, and infer a user preference based on other music tracks stored in that particular handset.

Mobile handset 302 can include a location component 314 that can employ various technologies, including a Global Positioning System (GPS) or other means to locate handset 302. Location component 314 can selectively tailor a particular promotional opportunity based on the location of the handset 302. For example, a promotion can include providing a coupon (e.g., ten percent off a particular album, video, . . . ) for all users that request information for a particular music track. The promotion can further direct the user to a store within the area in which that coupon can be redeemed. Since users can be remote from each other (e.g., different city, state, . . . ) the location component 314 can provide location information of the user. Cellular network 304 can tailor the promotion and direct each user to a local store. Therefore, a user in Idaho can be provided information regarding a participating store in Idaho while a user in Nebraska receives information about participating store(s) in Nebraska. The participating store information can also be tailored to a particular city and/or street, depending on the locating capability of the mobile handset 302 and/or the promotional criteria.

A capture component 316 associated with mobile handset 302 can be configured to capture embedded data signals from an audio output (e.g., a speaker) or an image (e.g., by a camera). For example, a camera phone can be utilized to capture an image, such as a billboard, that has an embedded image within the billboard image. The embedded image allows the image to be recognized by cellular network 304. A subscriber can use the mobile handset 302 to receive and capture such data signals. The captured data signals can be transmitted to a remote network (e.g., cellular network 304) which can then receive and translate the captured data and perform various functions, such as translating the captured data into a signal, another medium, or into a different form. For example, system 300 can generate a coupon, or allow a user to participate in a contest, a grand prize sweepstakes, or the like. There is a plurality of functional options provided by system 300. It should also be understood that the sound captured is not limited, and can include a plurality of structured sound patterns, such as DTMF (Dual Tone Multi-Frequency) tones, music, voice, etc.

In other embodiments, mobile handset 302 can include an RFID component 318 as a means for receiving and redeeming the promotion offer. The handset 302 can receive a message that contains embedded RFID information (e.g., a certificate). The user can take the handset 302 to a store, for example, and, utilizing RFID component 318, synchronize with an RFID receiving device to redeem the offer. In other embodiments, Bluetooth connectivity can be utilized. Alternatively or in addition, a message can be sent to the handset 302 wherein the message is embedded with a bar code. The bar code can then be displayed on a display and scanned at a store for prize redemption, for example. In other embodiments, the mobile handset 302 can be the RFID receiving device and the mobile handset 302 retransmits RFID information to the network 304.

Figure 4:
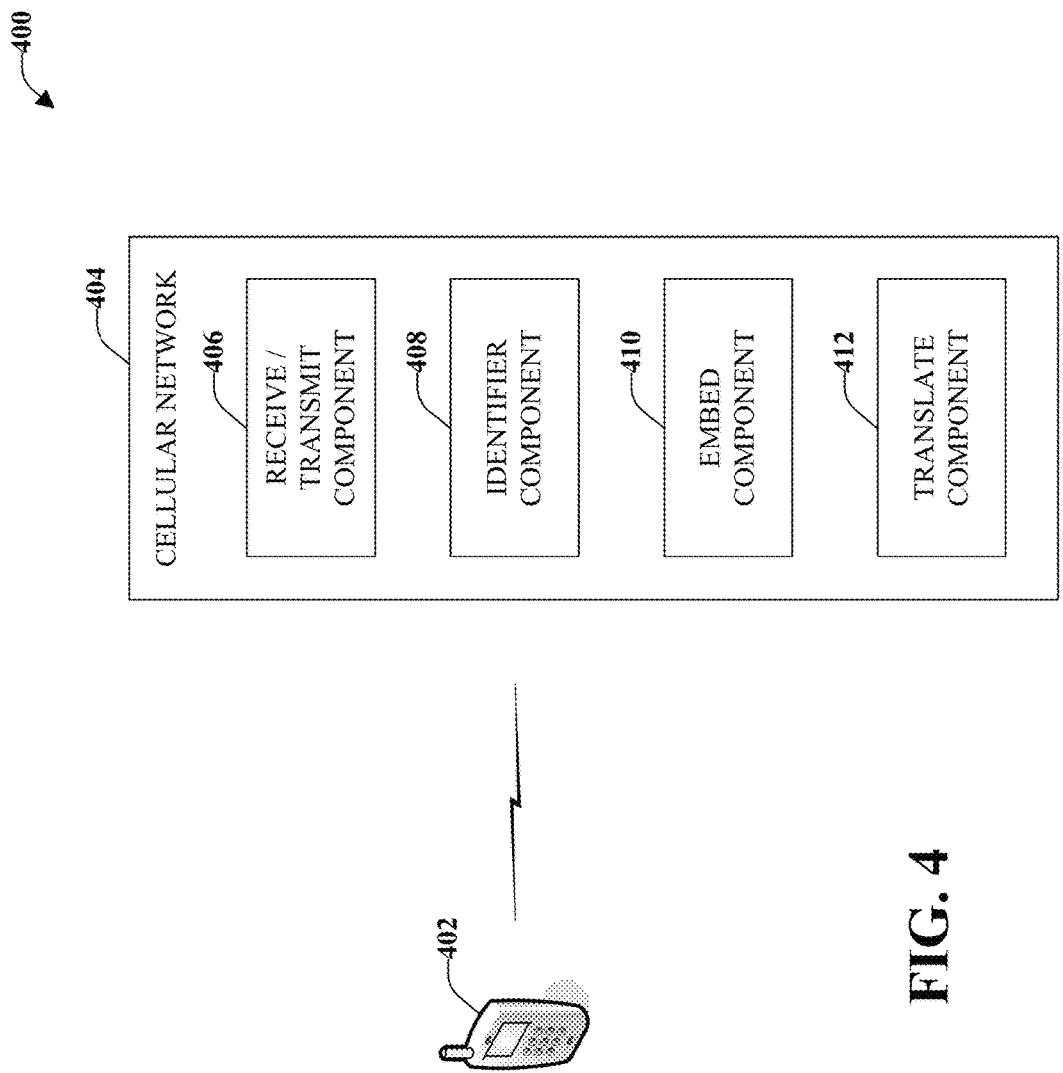
FIG. 4 illustrates a promotion operable recognition system.

FIG. 4 illustrates a promotion operable recognition system 400. System includes a mobile handset 402 that is in wireless communication with a cellular network 404. System 400 is configured to recognize various parameters associated with mobile handset 402 (and an associated user) and provide information to handset 402 including promotion information that can be tailored specifically for user of mobile handset 402.

Included in system 400 can be a receive/transmit component 406 that is configured to both transmit information to and receive information from handset 402. System 400 can also include an identifier component 408, an embed component 410, and/or a translate component 412. It should be understood that these components 406-412 are for illustration purposes only and there can be a different number of components or other functions associated with the components.

System 400 should be able to identify the user associated with mobile handset 402, where that user is located, as well as other identifying criteria associated with user. If a user is roaming an area and a limited time offer for a coupon is given, or another type of limited promotion is offered, it may be useful to first know if the subscriber entering the contest is a customer of the cellular network. It may also be useful to know whether the user resides within a predetermined distance of the area in which the promotion is being offered. This can mitigate the occurrence of a roaming subscriber winning the coupon, contest, etc. and not being able to redeem the prize. This situation would be common if a radio transmission is broadcast by a satellite radio transmission and an out-of-state subscriber attempts to enter the promotion.

Identifier component 408 is configured, through various identification means, to recognize and distinguish a user. A home location register (HLR) can be associated with identification component 408 to facilitate such determination. An HLR is a database that contains subscription information about subscribers in a mobile network. An HLR is a permanent SS7 (Signaling System 7) database used in various networks including Advanced Mobile Phone System (AMPS), Global System for Mobile Communications (GSM), and/or Personal Communications Service (PCS). An HLR can identify and/or verify that the user is associated with a particular cellular provider. It can also contain subscriber data related to features and services.

Embed component 410 can be configured to embed a tone or sound in an advertisement from which subscribers can win coupons, prizes, ring tones, etc. The winner, for example, may receive a SMS, or the like, redirecting the winning subscriber to a physical location, such as a particular restaurant. In another embodiment, the winning subscriber can be directed to an interactive web site, such as a media mall, or a ring tone store, or a business establishment so that the winner can redeem the prize. Embed component 410 can be configured to embed a message with RFID information. The handset 402 can receive the RFID information and synchronize that information with an RFID receiving device at a store, for example, to claim a prize or redeem an offer. In other embodiments, embed component 410 can embed a message with a bar code, which can be displayed on a display of the handset 402. This bar code can be scanned at a particular location for redemption of an offer or a prize, etc.

Translate component 412 is configured to translate or convert a message received from handset 402 into a coupon, sweepstakes entry, contest entry, or the like. Translate component 412 can further identify an audio tone, for example, and distinguish such audio tone and classify it depending on whether it is the correct tone in response to a promotion. If the received tone is the correct tone, the translate component 412 can translate the tone into a promotional response (e.g., generate a coupon, allow a user to participate in a contest or a sweepstakes, . . . ). If the received tone is not the correct tone, translate component 412 can convert the tone into an error response, such as "Sorry, that is not the winning tone." In another embodiment, translate component 412 can offer a consolation prize if the tone is not correct, or can simply disregard the received message.

Figure 5:
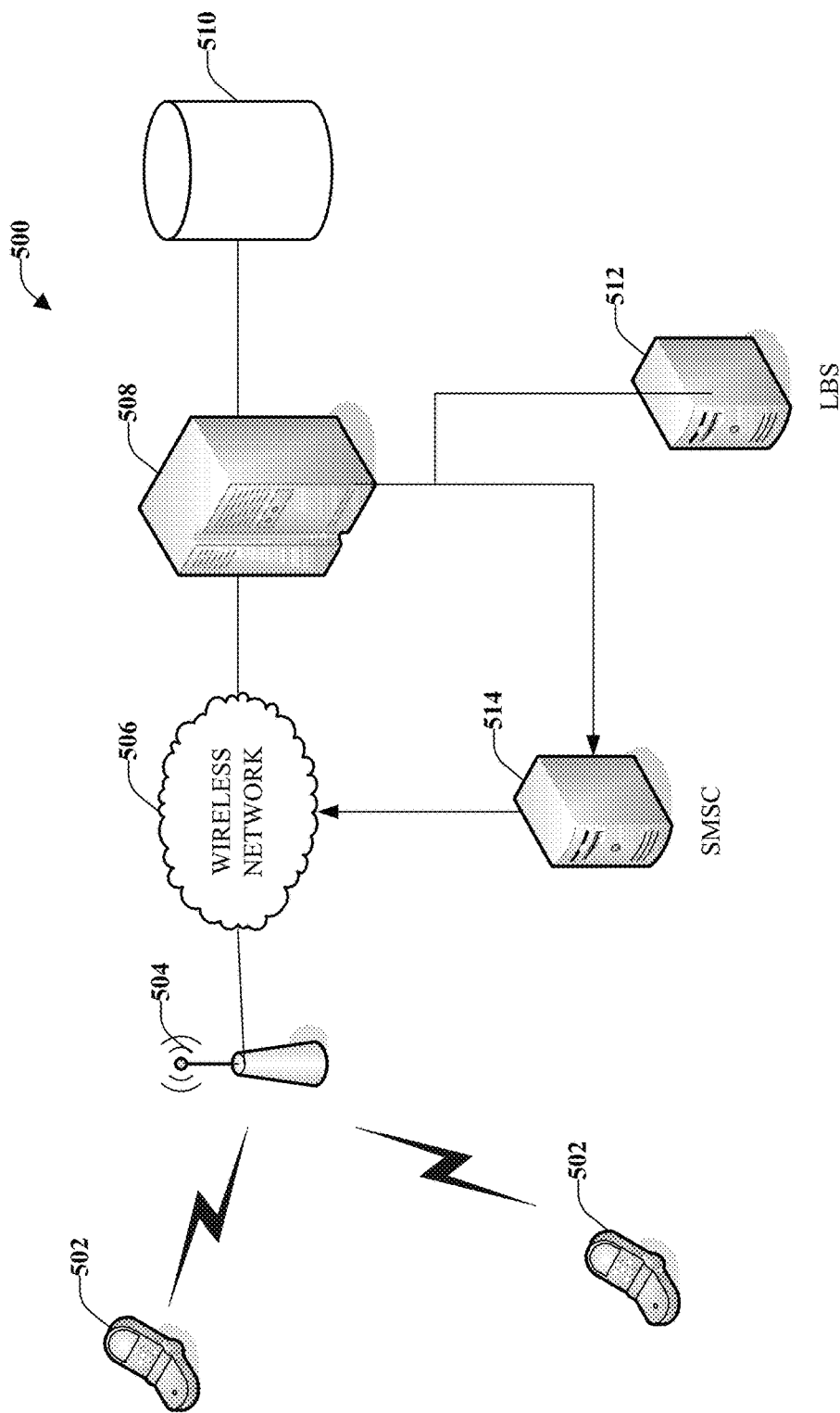
FIG. 5 illustrates a recognition system in accordance with the disclosed embodiments.

With reference now to FIG. 5, illustrated is a recognition system 500 in accordance with the disclosed embodiments. System 500 is configured to receive a communication from one or more mobile handset(s) 502. The communication can be received and routed though one or more access points 504, of which only one is illustrated for clarity purposes. Access point(s) 504 can transmit the communication though a wireless network, illustrated at 506, and the communication can be further transmitted to a network servicing the mobile handset(s) 502. The mobile handset(s) 502 can be utilized to receive and capture data signals (e.g., audio, video, images . . . ) and transmit those signals to a remote network element 508. The remote network element 508 receives the signals, such as a music file, and, by accessing a database 510 for permission levels, can further translate the captured data to perform various functions, such as translating the captured data into another medium. The database 510 can contain information regarding a promotion (e.g., coupon, sweepstakes, . . . ) available for a particular user based on a received tone, song, picture, user location, etc. For example, an audio recognition system can generate a coupon, or allow a user to participate in a contest, a sweepstakes, or the like. The functional options are numerous. It should be noted that audio signals captured are not limited, and can include a plurality of structured sound patterns, such as DTMF tones, music, voice, and the like.

System 500 can include a location based service (LBS) 512 configured to determine the location of the handset(s) 502. For example, a particular promotion might be intended for users that reside in a specific geographic location. The LBS 512 can determine if the user that transmitted the message resides in the area in which the promotion is offered. In such a manner, a user that might not be able to redeem the coupon, participate in the sweepstakes, or the like, is not sent the promotion.

The promotion information can be transmitted through a short messaging servicing center (SMSC) 514 that allows short text messages to be exchanged between mobile devices and other networks. SMSC 514 can send the mobile handset 502 information regarding the promotion in various forms, including URL information, whereby the user accesses the URL to enter the contest, redeem the coupon, etc. The signaling that may occur between the mobile station and the network may be a call flow path initiated from the mobile station through the network to a remote network element. The call may be terminated so that a path is established to exchange information to and from the mobile station and to the remote network element.

According to an embodiment, an audio recognition service allows a customer to identify various sounds/tones by placing the mouthpiece portion of a cellular phone adjacent to an audio speaker on an audio output device. The audio captured can then be communicated back to a network component through the subscriber network. The network component is capable of receiving, translating and performing various functions, such as to provide promotional items, like coupons, certificates, ring tones, and other similar downloads—not simply returning data indicative of a music sound as is currently known. For example, according to disclosed embodiments, it would be possible to purchase and download the song identified right on the handset.

Figure 6:
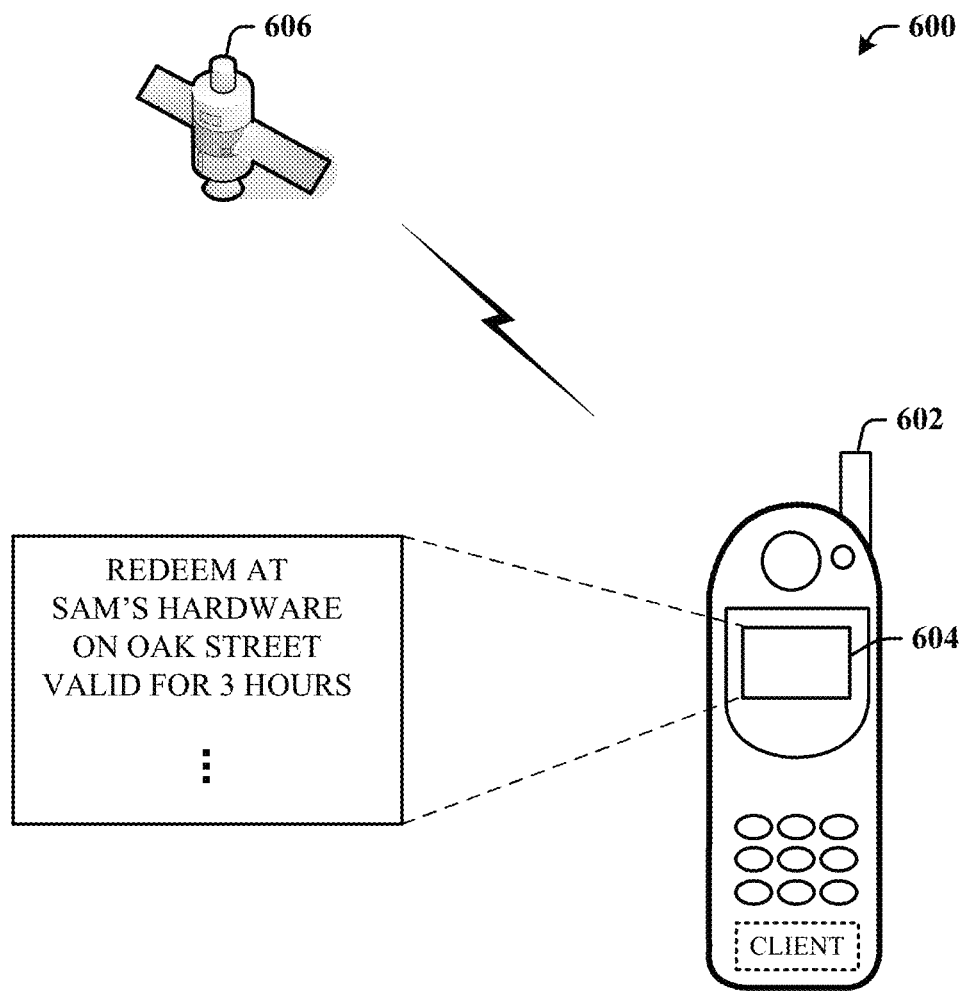
FIG. 6 illustrates a system whereby a terminal receives a coupon from an establishment for promotional purposes.

With reference now to FIG. 6, illustrated is a system 600 whereby a terminal receives a coupon from an establishment for promotional purposes. Terminal 602 includes software to process a data communication to a network in response to a promotion (e.g., coupon, sweepstakes, . . . ) and to display some or all of the result of entering the promotion through a display 604 of the terminal 602. This is dependent on the size of the display 604 of the terminal, and the amount of information to be displayed. Additional information or different information can be displayed to the user. This can be by selection or as a default set of data from a satellite radio system 606. It is to be appreciated that other information can be displayed relating to promotional opportunities as well as requested information (e.g., title of a song, artist, . . . ).

Figure 7:
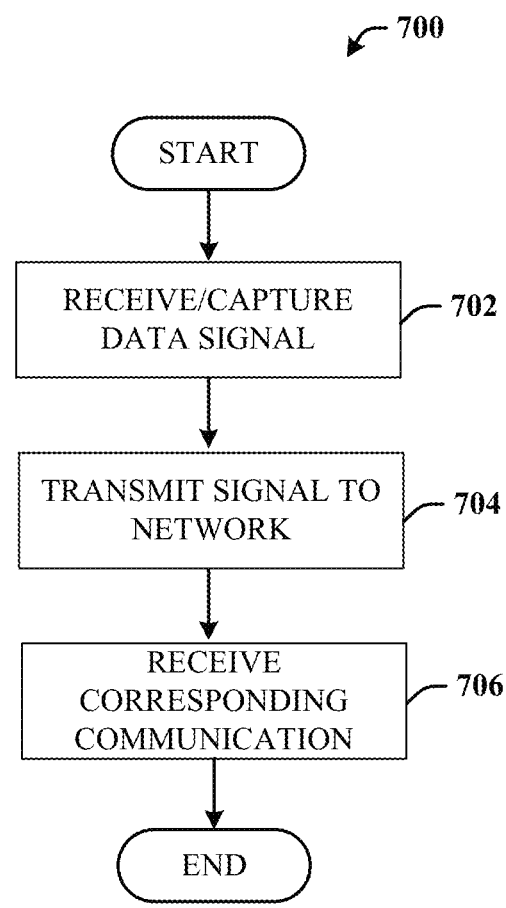
FIG. 7 illustrates a methodology for obtaining and transmitting a data content for promotional purposes.
Figure 8:
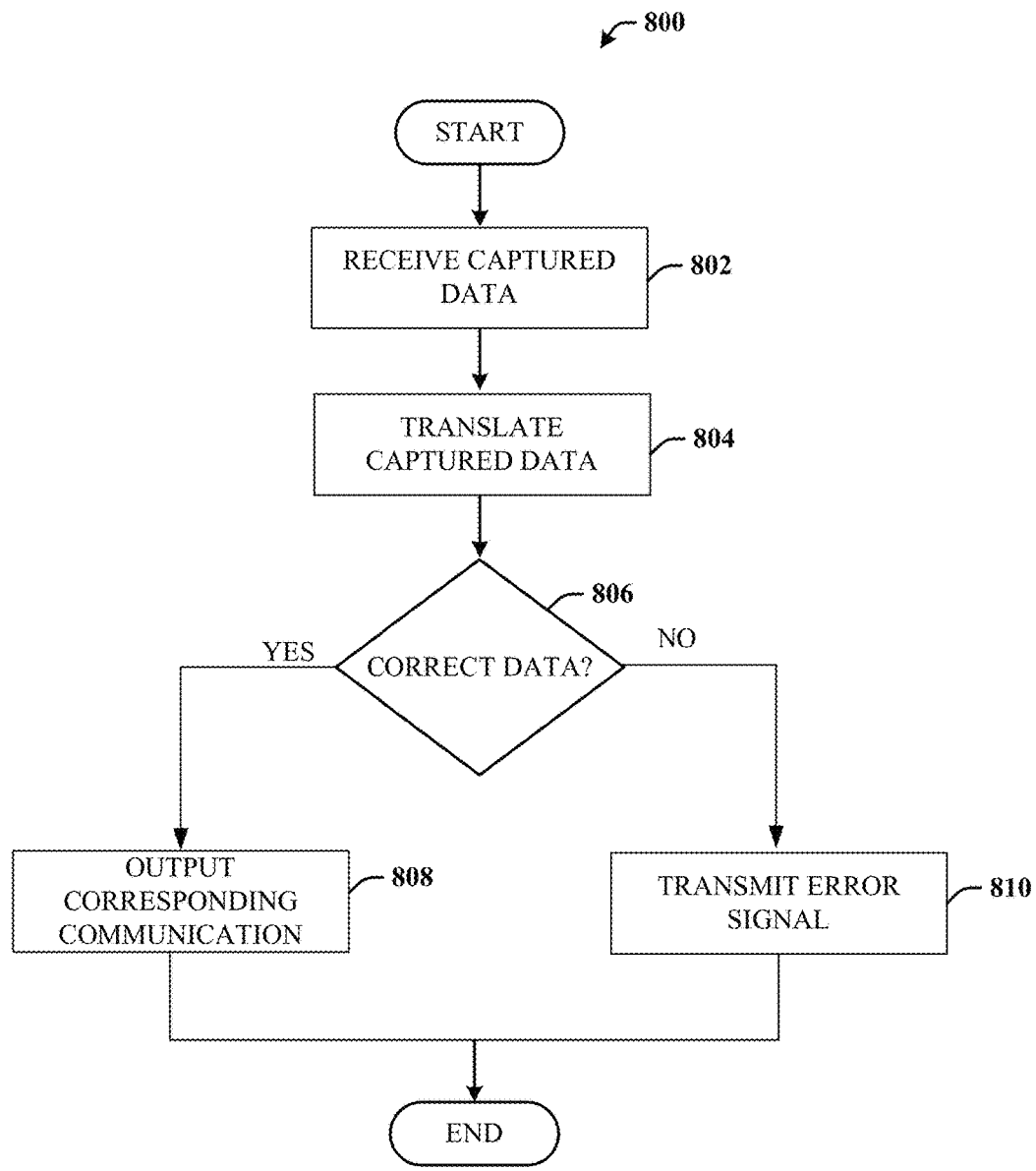
FIG. 8 illustrated is a methodology for operating a promotional event through a communication network.

In view of the exemplary systems shown and described above, methodologies, which may be implemented in accordance with one or more of the disclosed embodiments, will be better appreciated with reference to the diagram of FIGS. 7 and 8. While, for purposes of simplicity of explanation, the methodologies are shown and described as a series of acts (or function blocks), it is to be understood and appreciated that the methodologies are not limited by the order of acts, as some acts may, in accordance with these methodologies, occur in different orders and/or concurrently with other acts from that shown and described herein. It is also to be appreciated that the acts are merely to illustrate certain aspects presented herein in a simplified form and that these aspects may be illustrated by a lesser and/or greater number of acts. Moreover, not all illustrated acts may be required to implement the following methodologies. Those skilled in the art will understand and appreciate that a methodology could alternatively be represented as a series of interrelated states or events, such as in a state diagram. It is to be appreciated that the various acts may be implemented by software, hardware, a combination thereof or any other suitable means (e.g. device, system, process, component) for carrying out the functionality associated with the acts.

FIG. 7 illustrates a methodology 700 for obtaining and transmitting data content for promotional purposes. The method begins at 702 when a data signal is received at a mobile device. The received signal can be captured and/or stored by the device for transmission at a later time. For example, a user of a mobile device may be at a sporting event. During the sporting event, an audio tone or signal may be transmitted for those persons in attendance to capture the tone and/or signal on their mobile devices to enter, for example, a sweepstakes at a later time. In another embodiment, an audio tone may be transmitted over the radio and the tone captured through the radio speakers. In a further embodiment, the signal might be an image, such as a billboard or other image, which is intended to be captured for promotion purposes.

The method continues, at 704, where the signal is transmitted to a network. According to the above example, the users at the sporting event may capture the signal and/or tone and, to enter the sweepstakes, transmit the signal to a network (e.g., network subscriber) at a designated time (e.g., later in the day, week, . . . ).

After the signal is transmitted to the network, a corresponding communication is received, at 706. The corresponding communication can be a message indicating that the user of mobile device is the winner of the sweepstakes (or recipient of a coupon, etc.), if the transmitted signal is the winning signal. However, if the transmitted signal does not correspond to the sweepstakes requirements, an error signal can be received at mobile device indicating that the user is not the winner of the sweepstakes.

Referring now to FIG. 8, illustrated is a methodology 800 for operating a promotional event through a communication network. The method 800 begins, at 802, where data captured by a mobile device is received by a network, such as a mobile communication network. The captured data can be a specific audio tone, image, etc. At 804, the captured data is translated to, for example, another medium. For example, the signal can be translated and a coupon generated, or a user is given permission to participate in a contest, a grand prize sweepstakes, or the like. There is a plurality of functional options into which the data can be transmitted and the examples provided herein are not intended to limit the various embodiments.

The method continues, at 806, where a determination is made whether the received data is the correct data. For example, a determination is made whether the received data conforms to the promotional requirements (e.g., was the correct tone/audible sound received, did the received visual have the correct embedded image, and so forth). The determination can include transforming the data into a signal and accessing a database (associated with the network). The received signal is compared with the signal(s) maintained in the database and a determination is made whether the received signal corresponds with at least one signal maintained or stored in the database. If the received signal corresponds with a signal in the database, the received signal conforms to the promotional requirements.

In another embodiment, the correct data includes information associated with a user location, such as the current location of the user and/or the residence of the user. According to other embodiments, the data can be whether the user is a subscriber to a particular cellular network provider.

If the determination, at 806, is that the data is correct ("YES"), the method continues at 808, where a corresponding communication is output indicating to the user the status of their entry. This information can indicate that the user is, for example, the winner of a sweepstakes. If the determination, at 806, is that the data is not the correct data ("NO") an error signal (e.g., "Sorry, you are not the winner.", "Please try again." . . . ) is transmitted to the mobile device from which the captured data was received. An error signal can also be transmitted if the user is not in a specified geographic area (e.g., cannot redeem the coupon, cannot win the prize, . . . ).

Figure 9:
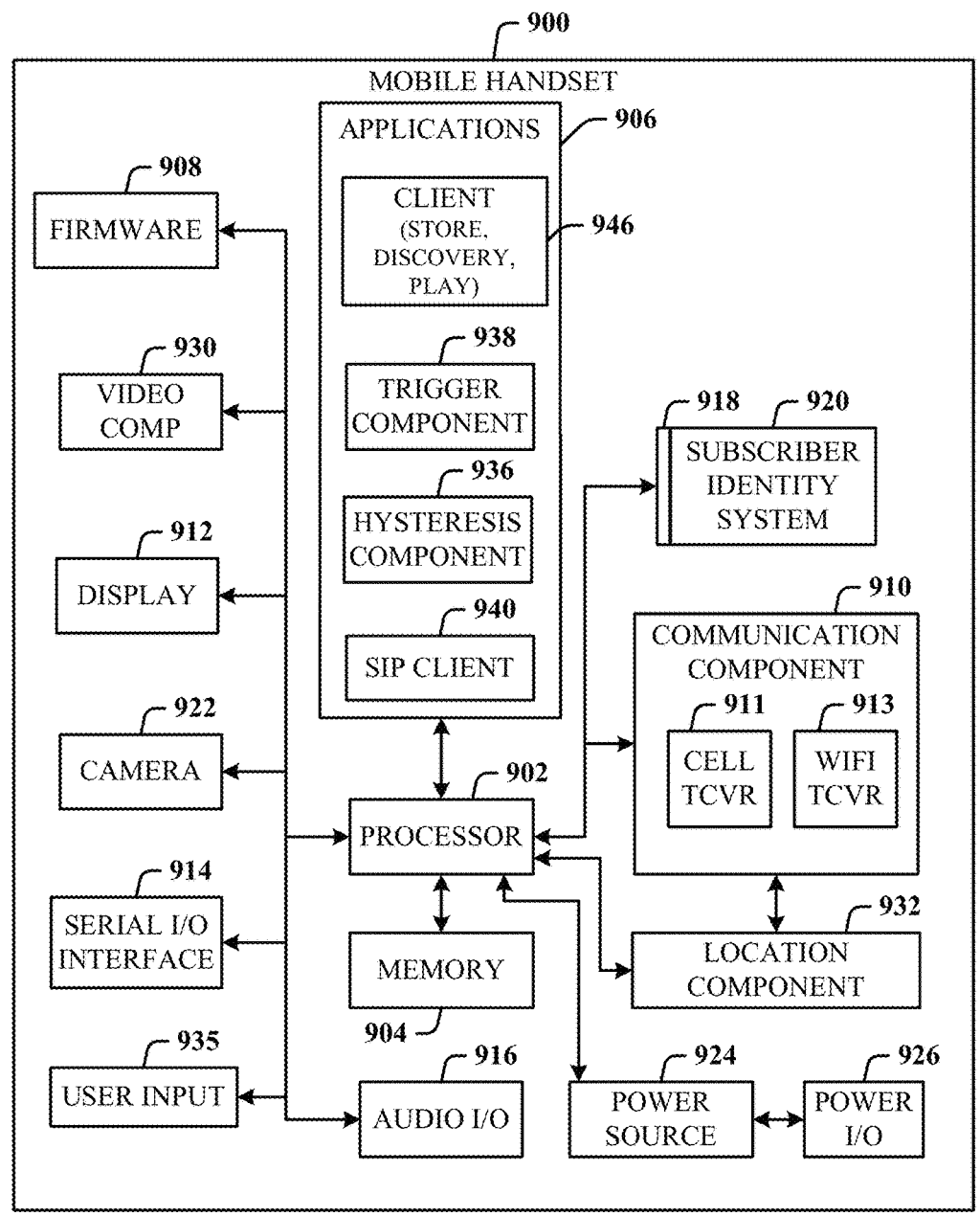
FIG. 9 illustrates a mobile handset that can process multimedia content in accordance with the embodiments disclosed herein.

FIG. 9 illustrates a schematic block diagram of a mobile handset 900 in accordance with some embodiments. In order to provide additional context for various aspects thereof, FIG. 9 and the following discussion are intended to provide a brief, general description of a suitable environment 900 in which the various aspects can be implemented. While the description includes a general context of computer-executable instructions, those skilled in the art will recognize that the subject specification also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the inventive methods can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of computer-readable media. Computer-readable media can be any available media that can be accessed by the computer and includes both volatile and non-volatile media, removable and non-removable media. By way of example and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media can include, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 900 includes a processor 902 for controlling and processing all onboard operations and functions. A memory 904 interfaces to the processor 902 for storage of data and one or more applications 906 (e.g., a video player software, user feedback component software, . . . ). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver)

and an unlicensed transceiver 913 (e.g., WiFi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. The display 912 can also accommodate the presentation of multimedia content (e.g., music metadata, messages, wallpaper, graphics, . . . ). A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software thereinto.

The handset 900 can process IP data traffic through the communication component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or decoded format.

A video processing component 922 (e.g., a camera) can be provided for decoding encoded multimedia content. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. A location tracking component 932 facilitates geographically locating the handset 900. As described hereinabove, this can occur when the user initiates the feedback signal automatically or manually. A user input component 935 facilitates the user initiating the quality feedback signal. The input component can include such conventional input device technologies such as a keypad, keyboard, mouse, stylus pen, and touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 938 when the WiFi transceiver 913 detects the beacon of the access point. A SIP client 940 enables the handset 900 to support SIP protocols and register the subscriber with the SIP registrar server. The applications 906 can also include a client 946 that provides at least the capability of discovery, play and store of multimedia content, for example, music.

The handset 900, as indicated above related to the communications component 910, includes an indoor network radio transceiver 913 (e.g., WiFi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
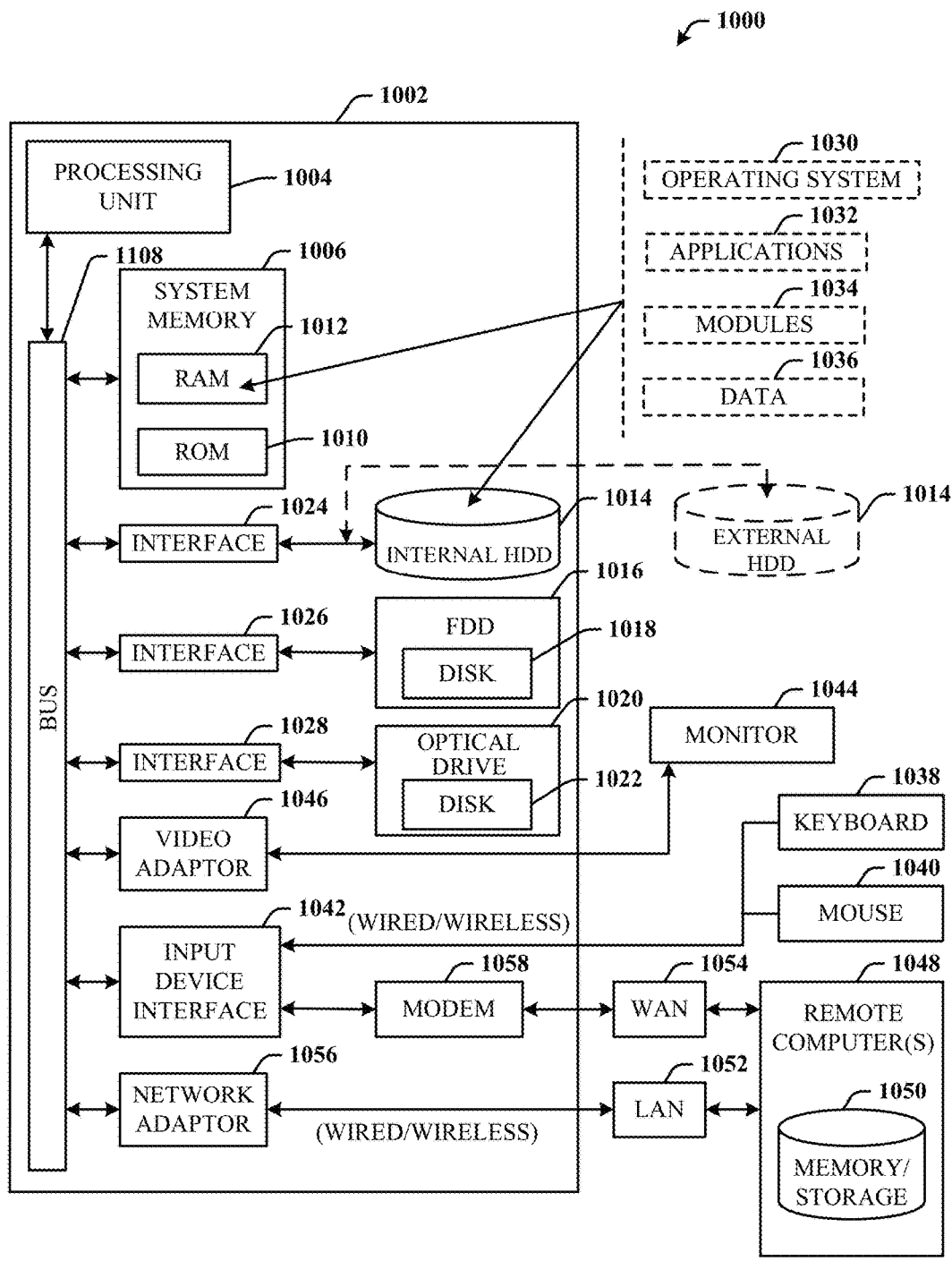
FIG. 10 illustrates a block diagram of a computer operable to execute the disclosed recognition system architecture.

Referring now to FIG. 10, there is illustrated a block diagram of a computer operable to execute the disclosed music-centric client and/or remote synchronization management architecture. In order to provide additional context for various aspects thereof, FIG. 10 and the following discussion are intended to provide a brief, general description of a suitable computing environment 1000 in which the various aspects of the disclosure can be implemented. While the description above is in the general context of computer-executable instructions that may run on one or more computers, those skilled in the art will recognize that the disclosure also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the disclosure may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 10, the exemplary environment 1000 for implementing various aspects includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures may also be employed as the processing unit 1004.

The system bus 1008 can be any of several types of bus structure that may further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 may also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject disclosure.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed specification.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is to be appreciated that the subject specification can be implemented with various commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 through an interface, such as a video adapter 1046. In addition to the monitor 1044, a computer typically includes other peripheral output devices (not shown), such as speakers, printers, etc.

The computer 1002 may operate in a networked environment using logical connections by wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1002 is connected to the local network 1052 through a wired and/or wireless communication network interface or adapter 1056. The adaptor 1056 may facilitate wired or wireless communication to the LAN 1052, which may also include a wireless access point disposed thereon for communicating with the wireless adaptor 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 through the serial port interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least WiFi and Bluetooth™ wireless technologies. Thus, the communication can be a predefined structure as with a conventional network or simply an ad hoc communication between at least two devices.

WiFi, or Wireless Fidelity, allows connection to the Internet from a couch at home, a bed in a hotel room, or a conference room at work, without wires. WiFi is a wireless technology similar to that used in a cell phone that enables such devices, e.g., computers, to send and receive data indoors and out; anywhere within the range of a base station. WiFi networks use radio technologies called IEEE 802.11 (a, b, g, etc.) to provide secure, reliable, fast wireless connectivity. A WiFi network can be used to connect computers to each other, to the Internet, and to wired networks (which use IEEE 802.3 or Ethernet). WiFi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 11:
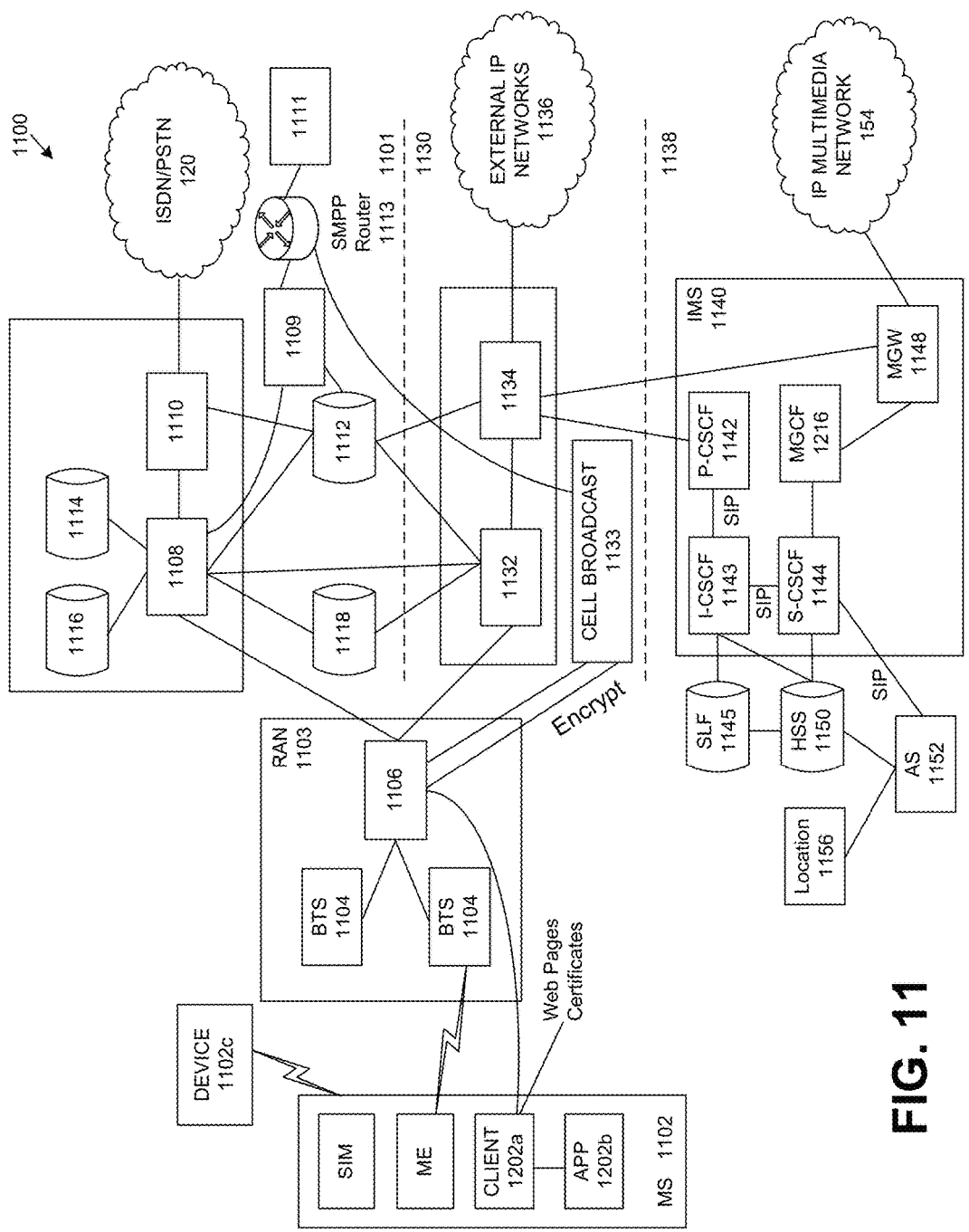
FIG. 11 illustrates an exemplary networking environment.

Now turning to FIG. 11, illustrated is an exemplary networking environment 1100. Network 1100 is a GSM/GPRS/IP (Global System for Mobile Communications/General Packet Radio Service/Internet Protocol) multimedia network architecture 1100 that includes a GSM core network 1101, a GPRS network 1130 and an IP multimedia network 1138. The GSM core network 1101 includes a Mobile Station (MS) 1102, at least one Base Transceiver Station (BTS) 1104 and a Base Station Controller (BSC) 1106. The MS 1102 is physical equipment or Mobile Equipment (ME), such as a mobile phone or a laptop computer that is used by mobile subscribers, with a Subscriber Identity Module (SIM). The SIM includes an International Mobile Subscriber Identity (IMSI), which is a unique identifier of a subscriber. The MS 1102 includes an embedded client 1102a that receives and processes messages received by the MS 1102. The embedded client 1102a may be implemented in JAVA.

The embedded client 1102a communicates with an application 1102b that provides services and/or information to an end user. One example of the application may be identification software that provides song title, artist name, coupons, promotion information, or other information that is received through the embedded client 1102a to the end user. The identification software may provide store information where the song can be purchased, upcoming concert events, etc. based on the location of the MS 1102. Those of ordinary skill in the art understand that there are many different methods and systems of locating an MS 1102.

Alternatively, the MS 1102 and a device 1102c may be enabled to communicate through a short-range wireless communication link, such as BLUETOOTH. For example, a BLUETOOTH SIM Access Profile may be provided in an automobile (e.g., device 1102c) that communicates with the SIM in the MS 1102 to enable the surrounding communications system to pull information from the MS 1102. The BLUETOOTH communication system in the area becomes an "embedded phone" that employs an antenna associated with the communication provider, such as an access point. The result is improved reception of calls made in the vicinity. As one of ordinary skill in the art would recognize, an automobile is one example of the device 1102c. There may be an endless number of devices 1102c that use the SIM within the MS 1102 to provide services, information, data, audio, video, etc. to end users.

The BTS 1104 is physical equipment, such as a radio tower, that enables a radio interface to communicate with the MS. Each BTS may serve more than one MS. The BSC 1106 manages radio resources, including the BTS. The BSC may be connected to several BTSs. The BSC and BTS components, in combination, are generally referred to as a base station (BSS) or radio access network (RAN) 1103.

The GSM core network 1101 also includes a Mobile Switching Center (MSC) 1108, a Gateway Mobile Switching Center (GMSC) 1110, a Home Location Register (HLR) 1112, Visitor Location Register (VLR) 1114, an Authentication Center (AuC) 1118, and an Equipment Identity Register (EIR) 1116. The MSC 1108 performs a switching function for the network. The MSC also performs other functions, such as registration, authentication, location updating, handovers, and call routing. The GMSC 1110 provides a gateway between the GSM network and other networks, such as an Integrated Services Digital Network (ISDN) or Public Switched Telephone Networks (PSTNs) 1120. In other words, the GMSC 1110 provides interworking functionality with external networks.

The HLR 1112 is a database that contains administrative information regarding each subscriber registered in a corresponding GSM network. The HLR 1112 also contains the current location of each MS. The VLR 1114 is a database that contains selected administrative information from the HLR 1112. The VLR contains information necessary for call control and provision of subscribed services for each MS currently located in a geographical area controlled by the VLR. The HLR 1112 and the VLR 1114, together with the MSC 1108, provide the call routing and roaming capabilities of GSM. The AuC 1116 provides the parameters needed for authentication and encryption functions. Such parameters allow verification of a subscriber's identity. The EIR 1118 stores security-sensitive information about the mobile equipment.

A Short Message Service Center (SMSC) 1109 allows one-to-one Short Message Service (SMS) messages to be sent to/from the MS 1102. A Push Proxy Gateway (PPG) 1111 is used to "push" (e.g., send without a synchronous request) content to the MS 1102. The PPG 1111 acts as a proxy between wired and wireless networks to facilitate pushing of data to the MS 1102. A Short Message Peer to Peer (SMPP) protocol router 1113 is provided to convert SMS-based SMPP messages to cell broadcast messages. SMPP is a protocol for exchanging SMS messages between SMS peer entities such as short message service centers. It is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 1102 sends a location update including its current location information to the MSC/VLR, through the BTS 1104 and the BSC 1106. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 1130 is logically implemented on the GSM core network architecture by introducing two packet-switching network nodes, a serving GPRS support node (SGSN) 1132, a cell broadcast and a Gateway GPRS support node (GGSN) 1134. The SGSN 1132 is at the same hierarchical level as the MSC 1108 in the GSM network. The SGSN controls the connection between the GPRS network and the MS 1102. The SGSN also keeps track of individual MS's locations and security functions and access controls.

A Cell Broadcast Center (CBC) 1133 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 1134 provides a gateway between the GPRS network and a public packet network (PDN) or other IP networks 1136. That is, the GGSN provides interworking functionality with external networks, and sets up a logical link to the MS through the SGSN. When packet-switched data leaves the GPRS network, it is transferred to an external TCP-IP network 1136, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, arc the GGSN.

In a GSM/GPRS network, GPRS services and GSM services can be used in parallel. The MS can operate in one three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time. A class B MS can attach to the network for both GPRS services and GSM services simultaneously. However, a class B MS does not support simultaneous operation of the GPRS services and GSM services. That is, a class B MS can only use one of the two services at a given time. A class C MS can attach for only one of the GPRS services and GSM services at a time. Simultaneous attachment and operation of GPRS services and GSM services is not possible with a class C MS.

A GPRS network 1130 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not received pages from a circuit switched domain when engaged in a data call, since the MS is receiving data and is not listening to a paging channel In a NOM3 network, a MS can monitor pages for a circuit switched network while received data and vise versa.

The IP multimedia network 1138 was introduced with 3GPP Release 5, and includes an IP multimedia subsystem (IMS) 1140 to provide rich multimedia services to end users. A representative set of the network entities within the IMS 1140 are a call/session control function (CSCF), a media gateway control function (MGCF) 1146, a media gateway (MGW) 1148, and a master subscriber database, called a home subscriber server (HSS) 1150. The HSS 1150 may be common to the GSM network 1101, the GPRS network 1130 as well as the IP multimedia network 1138.

The IP multimedia system 1140 is built around the call/session control function, of which there are three types: an interrogating CSCF (I-CSCF) 1143, a proxy CSCF (P-CSCF) 1142, and a serving CSCF (S-CSCF) 1144. The P-CSCF 1142 is the MS's first point of contact with the IMS 1140. The P-CSCF 1142 forwards session initiation protocol (SIP) messages received from the MS to an SIP server in a home network (and vice versa) of the MS. The P-CSCF 1142 may also modify an outgoing request according to a set of rules defined by the network operator (for example, address analysis and potential modification).

The I-CSCF 1143 forms an entrance to a home network and hides the inner topology of the home network from other networks and provides flexibility for selecting an S-CSCF. The I-CSCF 1143 may contact a subscriber location function (SLF) 1145 to determine which HSS 1150 to use for the particular subscriber, if multiple HSS's 1150 are present. The S-CSCF 1144 performs the session control services for the MS 1102. This includes routing originating sessions to external networks and routing terminating sessions to visited networks. The S-CSCF 1144 also decides whether an application server (AS) 1152 is necessary to receive information on an incoming SIP session request to ensure appropriate service handling. This decision is based on information received from the HSS 1150 (or other sources, such as an application server 1152). The AS 1152 also communicates to a location server 1156 (e.g., a Gateway Mobile Location Center (GMLC)) that provides a position (e.g., latitude/longitude coordinates) of the MS 1102.

The HSS 1150 contains a subscriber profile and keeps track of which core network node is currently handling the subscriber. It also supports subscriber authentication and authorization functions (AAA). In networks with more than one HSS 1150, a subscriber location function provides information on the HSS 1150 that contains the profile of a given subscriber.

The MGCF 1146 provides interworking functionality between SIP session control signaling from the IMS 1140 and ISUP/BICC call control signaling from the external GSTN networks (not shown). It also controls the media gateway (MGW) 1148 that provides user-plane interworking functionality (e.g., converting between AMR- and PCM-coded voice). The MGW 1148 also communicates with other IP multimedia networks 1154.

What has been described above includes examples of the disclosed specification. It is, of course, not possible to describe every conceivable combination of components and/or methodologies, but one of ordinary skill in the art may recognize that many further combinations and permutations are possible. Accordingly, the specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A network device, comprising:
 a processor; and
 a memory that stores executable instructions that, when executed by the processor, facilitate performance of operations, comprising:
 directing, to a mobile device, request data indicative of a request to capture first media data that is to be utilized to provide, to the mobile device, promotional data indicative of a promotion, wherein the request data has been selected based on location data, indicative of a geographical location of the mobile device, being determined to satisfy a location criterion;

comparing the first media data that was captured via the mobile device with second media data representing a defined media that was not captured via the mobile device, wherein the first media data has been captured in response to the directing of the request data, and wherein the first media data comprises embedded image data;

in response to determining, based on the comparing, that the first media data and the second media data satisfy a matching criterion, scanning the first media data to locate the embedded image data;

facilitating a transformation of the embedded image data into information that is to be embedded within instruction data that is to be directed to the mobile device, wherein the information comprises radio frequency identification data; and based on directing the instruction data to the mobile device, initiating a synchronization of the information with a communication device via a communication between the mobile device and the communication device to enable the promotion.

2. The network device of claim 1, wherein the promotion comprises a discount coupon.

3. The network device of claim 1, wherein the location data has been received from a global positioning system device.

4. The network device of claim 1, wherein the location data has been received from a data store of a cellular network.

5. The network device of claim 1, wherein the directing the instruction data comprises directing the instruction data in response to determining that identifier data indicative of an identifier of the mobile device that is accessed from a network data store satisfies a defined identifier criterion.

6. The network device of claim 1, wherein the directing the instruction data comprises directing the instruction data to the mobile device via a text message.

7. The network device of claim 1, wherein the first media data represents an image.

8. The network device of claim 1, wherein the embedded image data represents a defined arrangements of objects.

9. The network device of claim 1, wherein the radio frequency identification data comprises a radio frequency identification data certificate.

10. A method, comprising:
receiving, by a mobile device comprising a processor, request data indicative of a request to participate in a promotional activity, wherein the receiving comprises receiving the request data from a network device of a communication network, and wherein the request data is determined based on a geographical location of the mobile device;

in response to the receiving, recording, by the mobile device, media data that is to be utilized to participate in the promotional activity the request, wherein the media data comprises embedded image data;

providing, by the mobile device, the media data to the network device;

in response to the media data being determined to have satisfied a validity criterion, receiving, by the mobile device, synchronization data from the network device, wherein the synchronization data has been determined based on a translation of the embedded image data, and wherein the synchronization data comprises radio frequency identification data; and based on the synchronization data, synchronizing, by the mobile device, information with a communication device to initiate the promotional activity.

11. The method of claim 10, further comprising:
initiating, by the mobile device, an establishment of a secure connection between the mobile device and the communication device.

12. The method of claim 10, further comprising:
prior to the providing, encrypting, by the mobile device, the media data.

13. The method of claim 10, further comprising:
determining, by the mobile device, location data indicative of the geographical location of the mobile device; and
providing, by the mobile device, the location data to the network device, wherein the receiving the synchronization data comprises receiving the synchronization data that has been customized based on the location data.

14. The method of claim 10, wherein the receiving the synchronization data comprises receiving certificate data indicative of a radio frequency identification certificate.

15. The method of claim 10, wherein the providing the media data comprises the providing the media data during a defined time period.

16. A non-transitory machine-readable storage medium, comprising executable instructions that, when executed by a processor of a user equipment, facilitate performance of operations, comprising:
receiving, from a network device of a communication network, request data indicative of a request to participate in a promotional activity, wherein the request data has been determined based on a geographical location of the user equipment;

initiating a transmission of media data to the network device, wherein the media data is sensed by a sensor of the user equipment as a function of the receiving, and wherein the media data comprises embedded image data; and based on synchronization data that is received by the user equipment from the network device in response to a transformation of the embedded image data, synchronizing content between the user equipment and a communication device to perform the promotional activity, wherein the synchronization data comprises radio frequency identification data.

17. The non-transitory machine-readable storage medium of claim 16, wherein the synchronizing comprises initiating generation of a coupon.

18. The non-transitory machine-readable storage medium of claim 16, wherein the synchronizing comprises entering information indicative of the user equipment in a contest.

19. The non-transitory machine-readable storage medium of claim 16, wherein the media data comprises an image and the embedded image data comprises a defined arrangements of objects.

* * * * *